United States Patent [19]
Scott et al.

[11] Patent Number: 5,755,851
[45] Date of Patent: May 26, 1998

[54] DIRECT FORMING METHOD OF COLLECTING LONG WOOL FIBERS

[75] Inventors: James W. Scott, Newark; Larry J. Grant, Westerville, both of Ohio

[73] Assignee: Owens Corning Fiberglas Technology Inc., Summit, Ill.

[21] Appl. No.: 778,334

[22] Filed: Jan. 2, 1997

Related U.S. Application Data

[63] Continuation of Ser. No. 240,428, May 10, 1994, abandoned.

[51] Int. Cl.$^6$ .................................................. C03B 37/00
[52] U.S. Cl. ...................... 65/459; 65/470; 65/521; 65/530; 425/72.2
[58] Field of Search ..................... 65/455, 459, 460, 65/469, 470, 481, 505, 521, 522, 530; 264/8, 102; 425/8, 72.2, 75

[56] References Cited

U.S. PATENT DOCUMENTS

| | | |
|---|---|---|
| 2,333,218 | 11/1943 | Pazsiczky . |
| 2,897,874 | 8/1959 | Stalego et al. . |
| 2,931,076 | 4/1960 | Clark . |
| 2,940,134 | 6/1960 | Heritage . |
| 2,990,004 | 6/1961 | Sowers et al. . |
| 3,357,807 | 12/1967 | Stalego ........................... 156/62.4 |
| 3,481,005 | 12/1969 | Owens et al. . |
| 3,787,194 | 1/1974 | Rayle et al. ........................ 65/522 |
| 3,801,243 | 4/1974 | Smith et al. ...................... 65/522 X |
| 3,824,086 | 7/1974 | Perry et al. . |
| 3,865,540 | 2/1975 | Kiwddkwe . |
| 3,981,708 | 9/1976 | Loeffler et al. . |
| 4,167,404 | 9/1979 | Loefler et al. . |
| 4,280,253 | 7/1981 | Holt . |
| 4,478,624 | 10/1984 | Battigelli et al. . |
| 4,486,211 | 12/1984 | Monaghan . |
| 4,670,034 | 6/1987 | Goodridge et al. ................ 65/522 X |
| 4,744,810 | 5/1988 | Battigelli et al. . |
| 4,909,817 | 3/1990 | Gill et al. . |
| 5,431,992 | 7/1995 | Houpt et al. ...................... 65/438 X |

FOREIGN PATENT DOCUMENTS 9210602  6/1992  WIPO .

*Primary Examiner*—Curtis Mayes
*Attorney, Agent, or Firm*—C. Michael Gegenheimer; Curtis B. Brueske

[57] ABSTRACT

A method for collecting long glass fibers produces substantial lattice uniformity, eliminates the need for binder, and results in a generally rectangular wool pack which displays significant compressibility and recovery desired for commercial products. Generally spiral flow of fibers in the veil is captured on collecting conveyors and conveyed through direct forming apparatus with generally minimal disturbance of the spiral relationship between glass fibers. Further, a system is disclosed for producing wool insulation products of long glass fibers in accordance with the method. The principles and practices of the method and system may further be employed with short fibers to produce a wool pack of generally oriented short fibers.

23 Claims, 4 Drawing Sheets

DIRECT FORMING METHOD OF COLLECTING LONG WOOL FIBERS

CROSS-REFERENCE TO RELATED APPLICATION

This is a continuation of U.S. patent application Ser. No. 08/240,428, filed May 10, 1994, now abandoned.

TECHNICAL FIELD

This invention relates to wool materials of mineral fibers and, more specifically, to insulation products of long glass fibers. The invention also pertains to the manufacture of insulation products made of long wool fibers.

BACKGROUND OF THE INVENTION

Small diameter glass fibers are useful in a variety of applications including acoustical or thermal insulation materials. When these small diameter glass fibers are properly assembled into a lattice or web, commonly called a wool pack, glass fibers which individually lack strength or stiffness can be formed into a product which is quite strong. The glass fiber insulation which is produced is lightweight, highly compressible and resilient. For purposes of this patent specification, in using the terms "glass fibers" and "glass compositions", "glass" is intended to include any of the glassy forms of mineral materials, such as rock, slag and basalt, as well as traditional glasses.

The common prior art methods for producing glass fiber insulation products involve producing glass fibers from a rotary process. A single molten glass composition is forced through the orifices in the outer wall of a centrifuge or spinner, producing primarily straight glass fibers. The fibers are drawn downward by a blower. The binder required to bond the fibers into a wool product is sprayed onto the fibers as they are drawn downward. The fibers are then collected and formed into a wool pack. The wool pack is further processed into insulation products by heating in an oven, and mechanically shaping and cutting the wool pack.

Ideally, insulation products of glass fibers would have uniform spacing between fibers assembled in the lattice. Glass fiber insulation is basically a lattice which traps air between the fibers and prevents circulation of air to inhibit heat transfer. As well, the lattice also retards heat transfer by scattering thermal radiation. A more uniform spacing of fibers would maximize scattering and, therefore, have greater insulating capability.

In the production of wool insulating materials of glass fibers, it becomes necessary to use fibers that are relatively short to achieve desirable lattice properties. Long fibers tend to become entangled with each other, forming ropes, strings or more wispy entanglements. The aerodynamic properties of long fibers make them difficult to distribute, and conventional lapping techniques are largely ineffective in handling long fibers. The ropes of long fibers produce a commercially undesirable appearance and, more importantly, create deviation from the ideal uniform lattice and reduce the insulating abilities of the glass wool. For purposes of this patent specification, in using the terms "short fibers" and "long fibers", "short fibers" is intended to include fibers of approximately 2.54 centimeters (cm) (1 inch) and less, and "long fibers" are intended to include fibers longer than approximately 5.08 cm (2 inches).

However, even short fibers that are straight form only a haphazard lattice, and some of the fibers lie bunched together. As a result, existing glass wool insulating materials continue to have significant nonuniformities in the distribution of fibers within the product. Thus, the ideal uniform lattice structure cannot be achieved.

In addition, in the formation of short fibers the ultimate tensile strength of the fibers is achieved during the attenuation process. As a result, a number of very short, "dusty" particles is also produced. It is desirable to reduce this dust level to a level which is as low as possible to reduce irritation during installation.

A further problem presented by use of short straight fibers is the binder material necessarily added to the fibers to provide product integrity. Binder provides bonding at the fiber to fiber intersections in the lattice, but is expensive and has several environmental drawbacks. As most binders include organic compounds, great pains must be taken to process effluent from the production process to ameliorate the negative environmental impact of such compounds. Further, the binder must be cured with an oven, using additional energy and creating additional environmental cleanup costs. While long fibers display some fiber to fiber entanglement even without binder, the nonuniformity of the resulting wool packs has long made them commercially undesirable.

Finally, in addition to the properties of uniformity and integrity, it is desirable for wool packs to exhibit recovery from compression. In the shipping and packaging of insulation products, high compressibility is preferred. It is desirable to compress the wool for shipping and then have it recover rapidly and reliably to the desired size. When the product is compressed, the binder holds firm at fiber to fiber intersections while the glass fibers themselves flex. If the stress upon the fiber increases due to excessive compression, the fiber breaks. Thus, current insulation products are limited in the amount of compression possible while still attaining adequate recovery.

Thus, commercial wool insulation products of glass fibers have focused upon the use of short straight fibers, despite the various drawbacks in lattice non-uniformity, need for binder and related environmental concerns, and limited compressibility. Accordingly, the need remains for further improvements in wool insulation products to improve wool pack properties, reduce cost and eliminate environmental concerns.

SUMMARY OF THE INVENTION

The present invention satisfies that need by providing a method and system for collecting long glass fibers which provide substantial lattice uniformity, eliminate the need for binder, and result in a wool pack structure which displays significant compressibility and recovery, and reduced dustiness desired for commercial products.

As known in the production of conventional wool packs, short fibers will become nested, entangled and intermingled to form a structure. In accordance with the present invention, fibers are caused to behave differently, and collection tends to simply stack them along side of each other, and thus form little structure via entanglement.

It has been found in the production of long glass fibers that control of the veil and veil deposition is critical to collection of long fibers. Further, it has been found that minimum disturbance of the veil during production and minimum disturbance of the fibers collected therefrom, as disclosed herein, results in the production of commercially useful long glass fiber wool packs. A direct forming method and system are disclosed which achieve this end. While described with regard to preferred practice with long fibers, it is understood that the method and apparatus may also be practiced with short fibers to achieve similar results in orientation and fiber distribution.

In accordance with the present invention, the method for collecting long glass fibers begins with providing a rotary fiberizing apparatus, and producing therewith a veil of moving gases and long glass fibers. The veil may be also referred to herein as a column. The veil travels in a generally downward direction, with the long fibers therein having a generally spiral trajectory. The fibers are captured on at least two opposed first conveyor surfaces with the long fibers interrelated or oriented thereon in a generally spiral relationship. Thereafter, a wool pack of long fibers is formed while generally maintaining the spiral relationship between the long glass fibers. Thus, the wool pack structure ultimately reflects the orientation of fibers initially established in the veil by the fiberizer. Confining the veil to the desired shape of the pack has the profound effect of allowing the longer fibers to later be formed and entangled into the preferred pack structure.

Further, in accordance with the present invention, a system is disclosed for producing wool insulation products of long glass fibers including a long glass fiber collection apparatus which enables collection of a commercially useful wool pack of long glass fibers. The system includes at least two opposed foraminous first conveyors having first conveyor surfaces positioned generally vertically below a rotary fiberizing apparatus. The rotary fiberizer produces a veil of moving gases and long glass fibers, as discussed above, moving in a generally downward direction with the long fibers having a generally spiral trajectory. The first conveyor surfaces are in spaced relationship, positionable to intercept portions of the veil, operable in downwardly converging directions of motion, and include first suction apparatuses providing suction therethrough. Operation of these first conveyor surfaces in downwardly converging directions of motion, while receiving the long glass fibers thereon, separates the fiber forming gases by suction and captures the long fibers oriented thereon in a generally spiral relationship.

Prior art methods of producing wool packs typically include lappers alternately impacting the veil and scattering fibers; a long drop, typically eight to fifteen feet, to the collection conveyor to promote uniform distribution of conventional short fibers; and the application of binder, with its related environmental costs, for product integrity. The present invention makes possible the elimination of both lappers and binder, and provides a shorter drop to the first conveyor surfaces to control the veil, reducing system height. Moreover, the shorter drop reduces the amount of air and gases which must be handled and treated for environmental purposes. Rather, than promoting random scattering of fibers, the present invention achieves shape and uniform distribution of long fibers in a wool pack by maintaining the generally spiral relationship of the fibers established by the fiberizing process throughout wool pack production. This relationship is maintained without destroying the openness of the fibers which assists in removing gases during production, and provides good insulation value and recovery from compression in final product. Sufficient entanglement exists in the long fibers collected as disclosed herein to provide product integrity for later processing and packaging. Additional production steps may be added to further shape or enhance the integrity of the wool pack depending on the product application.

Finally, the direct forming method of the present invention permits the wool pack to be shaped and formed in a manner which eliminates the need for cutting the wool pack, as is required with conventional production techniques.

The present invention is preferably practiced using long fibers. Long fibers may be produced by conventional fiberizing techniques, or produced by new methods of producing long, irregularly shaped fibers, such as the bi-component glass fibers and related fiberizing techniques disclosed in and commonly assigned U.S. patent application Ser. No. 08/148,098, filed Nov. 5, 1993, now U.S. Pat. No. 5,431, 992, entitled DUAL-GLASS FIBERS AND INSULATION PRODUCTS THEREFROM, by Houpt et al. which is incorporated herein by reference.

As used herein, terms variously describing "wool packs of long fibers" refer to wool packs having a substantial proportion of long fibers, generally 50% or more by number or weight. Wool packs of long fibers may also include wool packs having somewhat smaller percentages of long fibers (greater than approximately 10%), which demonstrate the behavior of wool packs having higher percentages of long fibers.

DETAILED DESCRIPTION OF THE PREFERRED EMBODIMENTS

The method and system of the present invention may be used to produce wool packs of long glass fibers as representatively shown in FIGS. 1 through 5.

Figure 1:
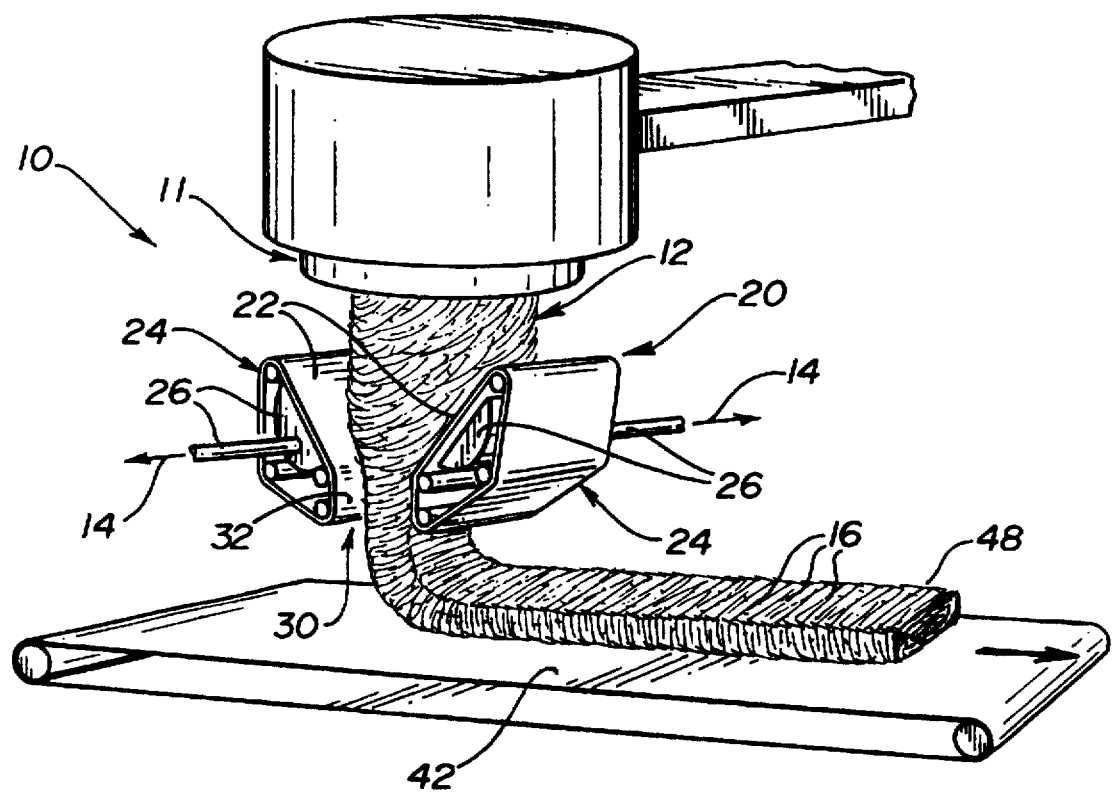
FIG. 1 is a schematic view in perspective of the direct forming process of the present invention.
Figure 2:
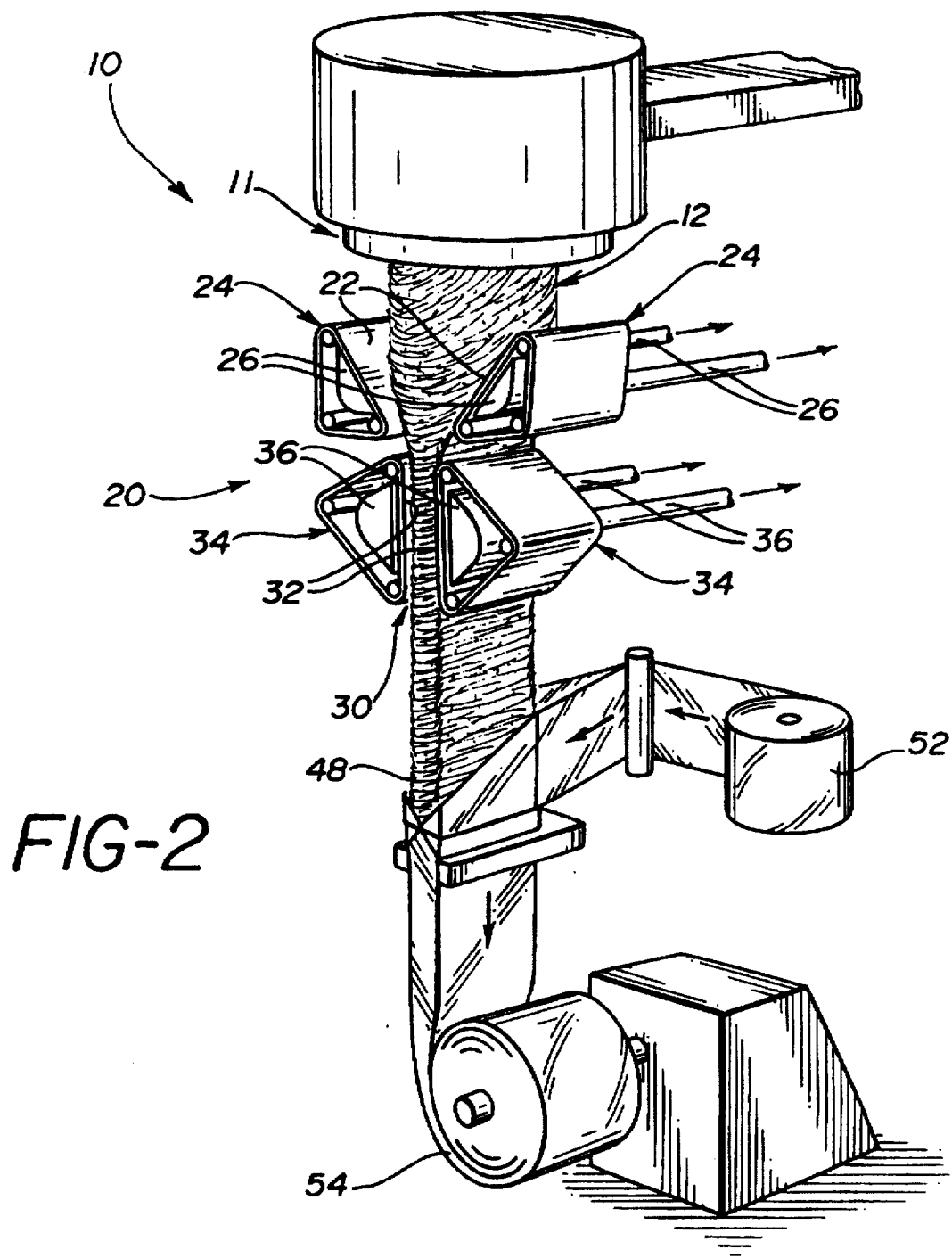
FIG. 2 is a schematic view in perspective of an alternative embodiment of the direct forming process of the present invention.

Referring to FIGS. 1 and 2, it may be seen that the direct forming method for collecting long glass fibers begins with providing a rotary fiberizing apparatus 11, and producing therewith a veil 12 of moving gases 14 and long glass fibers 16. The veil 12 may be also referred to herein as a column. The veil 12 travels in a generally downward direction, with the long fibers 16 therein having a generally spiral trajectory, as indicated generally. The long fibers 16 are captured on at least two opposed first conveyor surfaces 22 with the long fibers 16 generally oriented thereon in a generally spiral relationship. Thereafter, a wool pack 48 of long fibers is formed while generally maintaining their orientation.

Capturing the fibers includes receiving the long glass fibers 16 on the first conveyor surfaces 22, and separating the gases 14 in the veil 12 therefrom by exhausting the gases 14 through the first conveyor surfaces 22. The first conveyor surfaces 22, preferably planar foraminous surfaces, are further operated in downwardly converging directions to convey the long glass fibers 16 thus captured for forming into a wool pack 48. At their downwardmost points, the first conveyor surfaces are separated by a gap 28, shown best in FIG. 3, which leads to a passage 30 formed by second conveyor surfaces 32.

Referring again to FIGS. 1 and 2, the forming of a wool pack 48 includes forming a passage 30 with at least two second conveyor surfaces 32 in opposed, spaced relationship. The long fibers 16 are conveyed by the first conveyor surfaces 22 into the passage 30, and the wool pack 48 is shaped by its transit through the passage 30. During the step of forming, the general orientation of fibers, i.e. a generally spiral relationship, between the long fibers 16 on the first and second conveyor surfaces 22, 32 is preferably generally maintained by suction through those surfaces. The suction further serves to cool the wool pack, typically reducing the temperature an additional 100 to 200 degrees Fahrenheit (° F.), which is significant where packaging follows directly from the direct-forming process, as shown in FIG. 2. However, as shown in FIG. 1, the method may also be practiced without applying suction to the second conveyor surfaces 32. The temperature of the wool pack is typically in the range of 400° to 500° F., but can vary therefrom.

Figure 4:
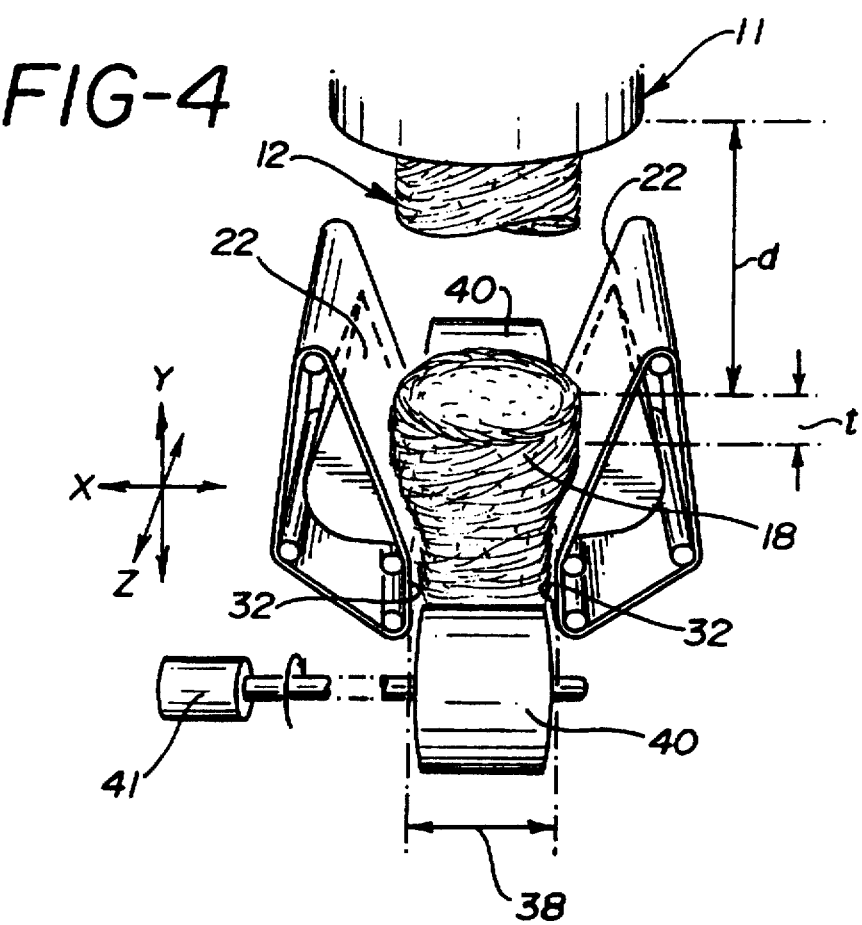
FIG. 4 is a schematic view in perspective of the conveyor surfaces and edge guides of the present invention.

Referring now to FIG. 4, it is preferred that the step of forming a passage 30 includes forming a generally rectangular passage, as shown, by positioning at least two opposed edge guides 40 in spaced relationship to generally define the sides of the passage 30.

Various additional steps may be performed in accordance with the present invention to produce desired results in the wool pack directly formed therewith, and thus will vary from product to product. In that regard, referring to FIG. 2, the step of forming may be performed by operating the first conveyor surfaces 22 at a first speed, and operating the second conveyor surfaces 32 at a second speed. Speed differences cause a degree of surface entanglement between the long glass fibers 16, and thus somewhat interrupt the oriented relationship of long fibers near the surface of the wool pack being formed. Greater entanglement which results from greater speed differences provides additional definition to the wool pack, but can produce some loss of recovery. It has been found that approximately equal speeds tend to produce maximum recovery, i.e. where the speed of the first conveyor surface 22 is approximately ¾ to 1½ times the speed of the second conveyor surface 32.

Both FIGS. 1 and 2 show that the steps of capturing the fiber orientation and forming a wool pack of long fibers are preferably performed sequentially in a generally vertical direction. FIG. 1 further shows that downstream from passage 30 the step of forming may further include receiving the wool pack 48 from the passage 30 on at least one third conveyor surface 42, and conveying the wool pack 48 on the third conveyor surface 42 in a generally horizontal direction. By generally horizontal, it is understood that the third conveyor surface 42 can be slightly inclined or declined.

Figure 5:
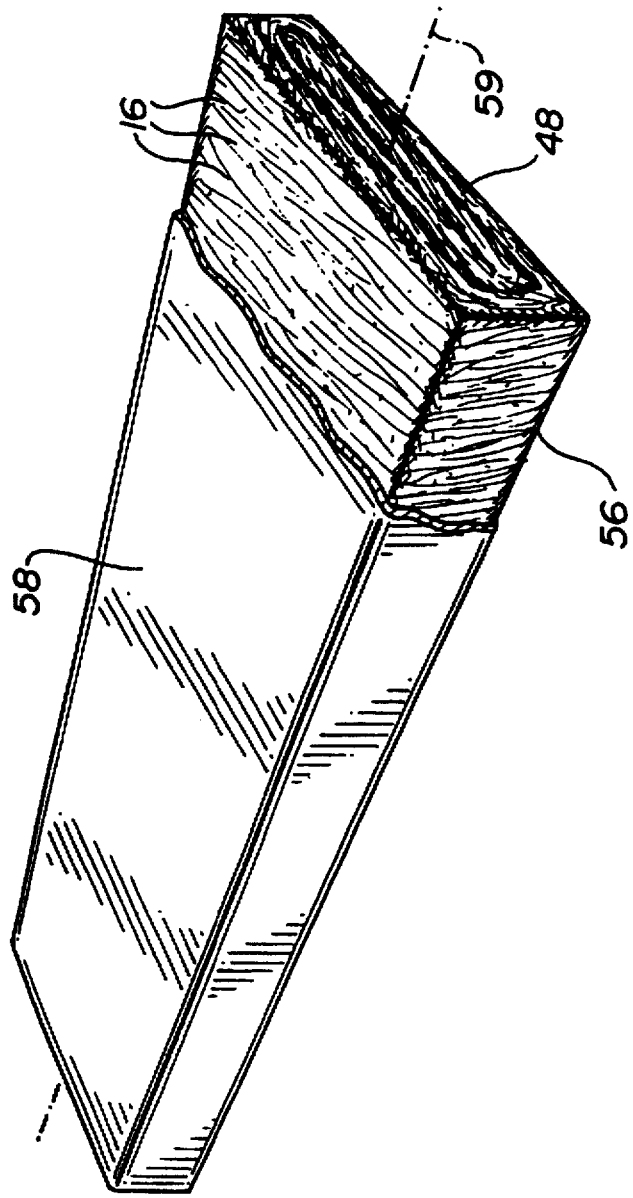
FIG. 5 is a schematic view in perspective of an embodiment of an insulation product including a wool pack produced in accordance with the present invention.

In addition, further steps may be performed down line to provide additional shape or other properties or characteristics to the wool pack 48. In this regard, FIG. 2 does not include the third conveyor surface 42, but illustratively shows a further step of shaping the wool pack to form a product. As shown, the wool pack 48 can be encapsulated with any suitable type of film, such as film 52. The wool pack may further be cut into individual units, such as insulation batts, prior to packaging. The product can be packaged by any suitable means, such as roll up apparatus 54. Referring to FIG. 5, an insulation batt 56 of long glass fibers directly formed in accordance with the present method is shown. It is understood that the batt 56 can be covered by film 52 or other exterior facing 58, many of which are known in the art.

In contrast with prior art practices which disturb the veil, and randomly scatter short fibers on a collecting conveyor, the present invention seeks to capture the flow of long glass fibers with minimal disturbance of the veil and the fiber orientation captured on the conveyor surfaces. Collection closer to the spinner helps preserve the veil. As the veil reaches the first conveyor surfaces 22, the flow of fiber forming gases assists in nesting and some initial entanglement of the generally oriented fibers. However, the oriented fibers have little structure via entanglement, and remain open.

Direct forming a wool pack 48 in accordance with the method set forth herein by constraining the fibers against movement with conveyor surfaces 22, 32 further forms pack shape and structure while maintaining the openness of the fibers, the generally uniform distribution, and the general orientation of fibers in the pack.

Openness not only helps in removing gases during the direct forming process, but provides good insulation values and aids in recovery in final products. As a result, additional steps may be performed in capturing the fibers to facilitate desired properties of the wool pack to be formed.

Referring again to FIG. 4, it is seen that capturing the long glass fibers may include collecting a stack of fibers, referred to herein as a dynamic stack 18, column or a loaf, where the fibers 16 intercept the first conveyor surfaces 22. A somewhat gentle collection of the fibers is preferred, to avoid densifying the stack 18. The dynamic stack 18 will have a stack thickness t, which is defined from the top of the stack 18 to first conveyor surfaces 22 approximately vertically therebelow. If the dynamic stack 18 is too high, it becomes difficult to manage and control. Thus, one critical dimension in stack formation is its thickness, t. A second dimension of interest is the distance, d, from the bottom of the rotary fiberizing apparatus 11 to the top of the stack. It is desirable for removal of gases that the distance d be as small as possible to reduce the volume of gas removal. The distance d is desirably chosen so as to minimize interference with the fiberizer process, and thus cannot be too short. As well, if distance d is too short, a higher density stack 18 results. As d increases, the velocity of the veil 12 decreases, so that distance d may be established to capture the long fibers without excessive compaction which destroys openness of the fibers.

Thus, the step of capturing can include controlling the thickness of the dynamic stack 18. It has been found that this may be performed in several ways, or a combination of ways, in addition to varying the distance, d. For example, thickness, t, may be controlled by varying the speed at which the first conveyor surfaces 22 convey the long fibers 16 in a generally converging downward direction. Control of "line speed" is a primary manner of controlling the thickness, t. Another way is by varying the suction through the first conveyor surfaces 22. However, varying the suction can affect fiber compaction, product recovery, uniformity of weight, and rectangularity of cross-section of the wool pack. A third way to control thickness, t, is by varying the angle of at least one of the first conveyor surfaces 22 relative to the generally downward direction of the veil 12. In general, one purpose of placing the first conveyors 22 at an angle is to manage and control the stack 18. However, where the angle of only one surface is varied, a non-uniform stack can result. The gap 28 between the first conveyor surfaces 22 also cooperates with these other factors in controlling stack formation and thickness, t. Finally, thickness t can be affected by varying the speed of third conveyor surface 42.

It has also been noted that the veil 12 may tend to wander slightly in its downward travel to the first conveyor surfaces, and management of the veil 12 is desirable. In this regard, the step of capturing the fibers may further include adjusting the first conveyor surfaces 22 in other ways. Thus, the step of capturing may further include adjusting laterally the position on the first conveyor surfaces 22 at which the dynamic stack 18 is collected. Lateral adjustment in direction may be performed in the x and z directions shown in FIG. 4, where x is the left-right direction, z is horizontal movement toward and away from the viewer, and y is vertical movement. Adjustment in the x direction also affects the height at which the first conveyor surface 22 intercepts the veil 12, and can either correct or induce non-uniformity in the formation of the stack 18.

Figure 3:
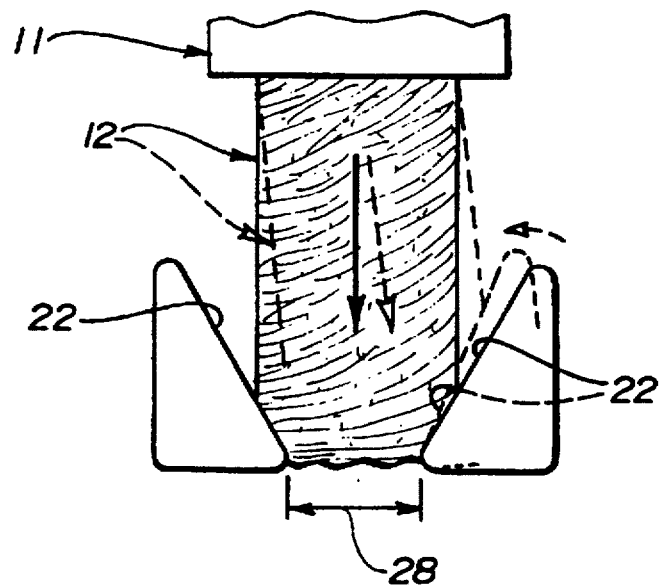
FIG. 3 is a schematic view in perspective of the veil of air and long fibers in relation to the first conveyor surfaces.

As further shown in FIG. 3, a more subtle effect on the travel of the veil 12 may be exerted by varying the suction applied through the first conveyor surfaces, or by varying the angle of at least one first conveyor surface 22 to bring the suction pressure closer to influence the, general downward travel the veil 12. That is, the steeper the first conveyors, the more influence suction has on the veil 12.

Finally, it is noted that the long fibers preferred in practicing the present invention produce wool packs with reduced dustiness desired for commercial products. Long fibers are the result of a fiberizing process where the forces on the fiber exceed the tensile strength of the fiber in only a few places rather than in many places. Reduced numbers of very short, "dusty" particles result from the attenuation process, and the resulting products of long fibers have reduced dust levels.

Referring again to FIGS. 1 and 2, in accordance with the present invention, a system 10 is disclosed for producing wool insulation products of long glass fibers 16 including a long glass fiber collection apparatus 20 which enables collection of a commercially useful wool pack 48 of long glass fibers. The system 10 includes at least two opposed, preferably foraminous, first conveyors 24 having first conveyor surfaces 22 positioned generally vertically below a rotary fiberizing apparatus 11. The first conveyor surfaces 22 are positionable to intercept portions of the veil 12 produced by the fiberizer moving in a generally downward direction with long glass fibers therein having a generally spiral trajectory. The first conveyor surfaces 22 are in spaced relationship, and operable in downwardly converging directions of motion, and include first suction apparatus 26 providing suction therethrough. The gap 28 between the first conveyor surfaces 22 is preferably approximately 7 to 14 inches wide, and their angle relative to vertical is preferably approximately 0 to 25 degrees. These dimensions are preferable, and may vary therefrom, as long as the desired result is achieved. The first conveyor surfaces 22 are preferably foraminous belts which are somewhat more open than typical collection belts used with conventional fibers and binders. Typical foraminous belts are designed to block the transit of binder which is sprayed into the veil 12 during the fiberizing process. As no binder is required in accordance with the present invention, more open foraminous belts may be used, which further facilitates removal of gases therethrough by suction. The more open belts are also easier to clean. Because the glass fibers collected thereon are long, they do not pass through the openings.

The first suction apparatus 26 separates gases 14 from the long glass fibers 16 in cooperation with the first conveyor surfaces 22 operating in downwardly converging directions, to capture the long fibers thereon in a generally spiral relationship. The first suction apparatus 26 includes a suction plenum, as known in the art and a suction line leading to a source of vacuum. The suction line preferably includes flexible sections to allow adjustments in conveyor surface positions described herein, and further preferably includes a device for varying the amount of suction, such as a control valve, baffle, or other device.

The distance from the fiberizing apparatus 11 and the first conveyor surfaces 22 in accordance with the present invention is significantly less than in conventional systems. To enhance random deposition of short fibers, conventional systems allow the veil to drop typically eight to fifteen feet. In accordance with the present invention, the drop, generally less than eight feet, is preferably approximately two to six feet, but can be more, if needed. The short drop not only inhibits disturbance of the veil 12, it reduces the amount of air and gas which must be exhausted out the first conveyor surfaces 22. This, in turn, reduces the volume of gases which must be handled by plant environmental systems, and reduces related treatment costs.

As shown in FIG. 4, at least one of the first conveyor surfaces 22 is preferably laterally adjustable in the x and/or z direction, and/or vertically adjustable in the y position. As shown in FIG. 3, the angle of inclination relative to vertical of at least one of the first conveyor surfaces 22 is preferably variable. In addition, it is preferred that the first conveyor surfaces 22 are operable at different speeds. The particular drive mechanisms for such adjustments is not critical to the present invention, and automatic or manual adjustment is contemplated.

Referring again to FIGS. 1 and 2, the long glass fiber collection apparatus 20 further includes at least two second conveyor surfaces 32 in opposed, spaced relationship defining a passage 30, and positioned to receive long fibers conveyed by the first conveyor surfaces 22. In FIG. 1, the first conveyors 24 include both the first and second conveyor surfaces 22, 32, while in FIG. 2, the first conveyors 24 include only the first conveyor surfaces 22, and the apparatus 20 includes separate second conveyors 24 which include the second conveyor surfaces 32.

As shown in FIG. 2, the second conveyor surfaces 32 preferably further include second suction apparatus 36 positioned thereunder to maintain the general relationship of the long fibers 16 on the second conveyor surfaces 32. It is understood that suction may also be applied to the second conveyor surface 32 in FIG. 1. The second suction apparatus 36 is of like design as the first suction apparatus 26 described above. Other aspects of the second conveyor surfaces 32 are similar to first conveyor surfaces 22, as well. The second conveyor surfaces 32 preferably include foraminous belts, and are adjustably positionable in like fashion as the first conveyor surfaces 22. The second conveyor 32 surfaces forming the passage 30 are preferably generally parallel, but may also may be in a slightly converging or diverging relationship.

The first and second conveyor surfaces 22, 32 are preferably planar, as planar surfaces have been found to enhance capture of the long glass fibers. However, convex and concave surfaces may also be used, but have a tendency to disturb the interrelationships between the long fibers 16 on the surfaces of the stack 18 as the glass fibers are conveyed on the surfaces 22. Such disturbance, however, may be desirable in some product applications. In the extreme, where convex drum surfaces are used for the first or second conveyor surfaces 22, 32, transition sections between the first and second conveyor surfaces 22, 32 are required to pass the fibers 16 therebetween. Second conveyor surfaces 32 could also be a fixed plate, preferably low-friction, or a freely rotatable belt.

Referring now to FIG. 4, the passage 30 may be further defined by the system of claim 11 further comprising at least two edge guides 40 in opposed, spaced relationship generally defining the width 38 of the passage 30. For a given set of conveyor surface speeds, there is an ideal gap 28 and width 38 giving shape and recovery at desired levels. The edge guides 40 may be wheels (by way of example, not limitation, 16 inch diameter, 2–5 inch width wheels), rollers or planar surfaces (not shown), fixed or moveable, smooth or foraminous, with or without suction applied. The edge guides 40 may either be driven by drive means 41, preferably driven at the same speed as second conveyor surfaces 32, or freely rotatable, e.g. mounted on low-friction bearings. In any case, it is intended that minimal entanglement of the long fibers 16 result from the contact, as the edge guides 40 rather shape the hot long glass fibers 16 moving through the passage 30. To this end, it is preferred that the edge guides 40 have smooth surfaces, which are freely rotatable to move at the same speed as the second conveyor surfaces 32. It has been found that freely rotatable wheels provide desirable forming for the edges of the wool pack 48.

In this regard, the width of freely rotatable wheels used as edge guides 40 has been found to have a large impact on the resulting pack shape. With a wheel width of about 12.7 cm (5 inches) appearing optimal for a gap 28 of generally 17.8 cm (7 inches) to 33.0 cm (13 inches). Substantially rectangular wool packs have been formed requiring no further shaping or forming prior to further packaging, as illustratively shown in FIG. 2.

As may be seen best in FIG. 5, the wool pack 48 emerges from the system 10 of the present invention with fibers 16 generally oriented and generally uniformly distributed throughout a significant portion of the wool pack. The system captures the generally spiral relationship between the long glass fibers established in the veil by the rotary fiberizing apparatus, but more importantly maintains the orientation of the fibers to permit directly forming a wool pack 48 from the veil 12. In the final wool pack 48, the fibers 16 may be loosely described as being generally oriented about the longitudinal axis 59 of the wool pack 48. The resulting product has significant lattice uniformity, and desirable recovery and compressibility, and makes possible the use of long glass fibers 16 in commercial glass wool products.

The present invention may be practiced using long fibers produced by conventional fiberizing techniques, as well as long, irregularly shaped bicomponent fibers and fiberizing techniques which are the subjects of commonly assigned and U.S. patent application Ser. No. 08/148,098, now U.S. Pat. No. 5,431,992, previously incorporated herein by reference.

While described with regard to preferred practice with long fibers, it is understood that the principles and practices of the method and system of the present invention may also be employed to achieve similar results in orientation and distribution of short fibers, and fibers of materials other than glass.

While certain representative embodiments and details have been shown for purposes of illustrating the invention, it will be apparent to those skilled in the art that various changes in the method and system disclosed herein may be made without departing from the scope of the invention, which is defined in the appended claims.

We claim:

1. A method for collecting fibers, comprising:
   providing a rotary fiberizing apparatus;
   producing therewith a veil of moving gases and fibers, said veil traveling in a generally downward direction, and said fibers therein having a generally spiral trajectory;
   capturing said fibers oriented in a generally spiral relationship upon at least two opposed conveyor surfaces, wherein at least one of said two opposed conveyor surfaces is operating in a downwardly converging direction of motion toward another of said at least two opposed conveyor surfaces and said capturing step includes separating the gases from the fibers by exhausting gases through said opposed conveyor surfaces; and
   forming a wool pack of fibers while generally maintaining the orientation of said fibers.

2. The method of claim 1, wherein said step of capturing includes:
   receiving the veil at said opposed conveyor surfaces operating in downwardly converging directions.

3. The method of claim 2 wherein said step of receiving is performed at a distance less than eight feet below said rotary fiberizing apparatus.

4. The method of claim 1 wherein said step of capturing comprises capturing said fibers on planar first conveyor surfaces.

5. The method of claim 1 wherein the step of capturing further comprises:
   collecting said fibers in a stack on said conveyor surfaces; and
   controlling the thickness of said stack.

6. The method of claim 1 wherein the step of forming comprises forming a generally rectangular pack.

7. The method of claim 6 wherein the step of forming comprises controlling the width of said generally rectangular pack.

8. The method of claim 1 wherein said steps of capturing said fibers and forming a wool pack of fibers are performed sequentially in a generally vertical direction.

9. The method of claim 1 wherein said step of producing a veil of moving gases and fibers, includes producing fibers from the group consisting of short fibers, long fibers, and combinations thereof.

10. A method for collecting fibers comprising:
    providing a rotary fiberizing apparatus;
    producing therewith a veil of moving gases and fibers, said veil traveling in a generally downward direction, and said fibers therein having a generally spiral trajectory;
    capturing said fibers in an orientation generally established in said veil on at least two opposed first conveyor surfaces, wherein at least one of said two opposed first conveyor surfaces is operating in a downwardly converging direction of motion toward another of said at least two opposed first conveyor surfaces, said step of capturing including:
    substantially removing the gases produced with said fibers in said veil by exhausting gases through said first conveyor surfaces; and
    generally maintaining the orientation of said fibers remaining on said first conveyor surfaces; and
    forming a wool pack of fibers while generally maintaining the orientation of said fibers;
    whereby a wool pack is formed wherein generally oriented fibers are generally uniformly distributed.

11. The method of claim 10 wherein said step of producing a veil of moving gases and fibers, includes producing fibers from the group consisting of short fibers, long fibers, and combinations thereof.

12. A method for collecting fibers, comprising:
    providing a rotary fiberizing apparatus;
    producing therewith a veil of moving gases and fibers, said veil traveling in a generally downward direction, and said fibers therein having a generally spiral trajectory;

capturing said fibers oriented in a generally spiral relationship upon at least two opposed conveyor surfaces, wherein said capturing step includes separating the gases from the fibers by exhausting gases through said opposed conveyor surfaces; and forming a generally rectangular wool pack of fibers while generally maintaining the orientation of said fibers, said step of forming comprising controlling the width of said generally rectangular pack by providing at least two edge guides in opposed, spaced relationship which engage said fibers.

13. The system of claim 12, wherein said edge guides comprise rollers and a drive mechanism for effecting movement of said rollers.

14. A method for collecting fibers, comprising:

providing a rotary fiberizing apparatus;

producing therewith a veil of moving gases and fibers, said veil traveling in a generally downward direction, and said fibers therein having a generally spiral trajectory;

capturing said fibers oriented in a generally spiral relationship upon at least two opposed conveyor surfaces, wherein said capturing step includes separating the gases from the fibers by exhausting gases through said opposed conveyor surfaces;

forming a wool pack of fibers while generally maintaining the orientation of said fibers, and wherein said opposed conveyor surfaces are first conveyor surfaces, and said step of forming a wool pack includes:
   forming a passage with at least two second conveyor surfaces in opposed, spaced relationship;
   conveying said fibers with said first conveyor surfaces into said passage; and
   generally maintaining the orientation of said fibers on said first and second conveyor surfaces by suction through said first and second conveyor surfaces to form a wool pack.

15. A method for collecting fibers comprising:

providing a rotary fiberizing apparatus;

producing therewith a veil of moving gases and fibers, said veil traveling in a generally downward direction, and said fibers therein having a generally spiral trajectory;

capturing said fibers on at least two opposed first conveyor surfaces with said fibers oriented thereon in a generally spiral relationship, said step of capturing including:
   receiving said fibers on planar, foraminous first conveyor surfaces operating in downwardly converging directions; and
   separating gases from said fibers by exhausting gases through said first conveyor surfaces; and forming a wool pack of fibers while generally maintaining the orientation of said fibers, said step of forming a wool pack including:
   forming a passage with at least two second conveyor surfaces in opposed, spaced relationship;
   conveying said fibers with said first conveyor surfaces into said passage; and
   generally maintaining the orientation of said fibers on said first and second conveyor surfaces by suction through said first and second conveyor surfaces to form a wool pack.

16. The method of claim 15 wherein said steps of capturing said fibers and forming a wool pack of fibers are performed sequentially in a generally vertical direction.

17. A system for producing wool insulation products of long fibers including a fiber collection apparatus comprising:

at least two opposed first conveyors having foraminous first conveyor surfaces positioned generally vertically below a rotary fiberizing apparatus which produces a veil of moving gases and long fibers, said veil traveling in a generally downward direction, and said long fibers therein having a generally spiral trajectory wherein:
   said first conveyor surfaces are in spaced relationship, positionable to intercept portions of said veil, and operable in downwardly converging directions of motion; and
   said at least two conveyors include first suction apparatuses providing suction through said first conveyor surfaces;

whereby operation of said first conveyor surfaces in downwardly converging directions of motion while receiving said long fibers thereon separates gases from said fibers and captures said long fibers thereon in a generally oriented relationship.

18. The system of claim 17 wherein said first conveyor surfaces are planar surfaces positioned at angles relative to said generally downward direction.

19. The system of claim 17 further comprising at least two second conveyor surfaces in opposed, spaced relationship defining a passage, and positioned to receive fibers conveyed by said first conveyor surfaces.

20. The system of claim 19 wherein:

said at least two second conveyor surfaces include second suction apparatus positioned thereunder to maintain the general relationship of said fibers on said second conveyor surfaces; and at least one of said first and second suction apparatuses are variably operable to vary the amount of suction, respectively, through at least one of said first and second conveyor surfaces.

21. The system of claim 19 wherein:

said system includes second conveyors having said second conveyor surfaces; and the speed of operation of at least one of said first and second conveyor surfaces is variably adjustable.

22. The system of claim 19 wherein at least one of said first and second conveyor surfaces is adjustably positionable in at least one direction of movement.

23. The system of claim 19, further comprising at least two edge guides in opposed, spaced relationship for generally defining a width of the passage.

* * * * *